United States Patent
Schmidt et al.

(10) Patent No.: US 8,815,467 B2
(45) Date of Patent: *Aug. 26, 2014

(54) MEMBRANE ELECTRODE ASSEMBLY AND FUEL CELLS WITH IMPROVED LIFETIME

(75) Inventors: Thomas Justus Schmidt, Wuerenlingen (CH); Oliver Gronwald, Frankfurt (DE); Detlef Ott, Sulzbach (DE); Christoph Hartnig, Eppstein (DE)

(73) Assignee: BASF SE, Ludwigshafen (DE)

( * ) Notice: Subject to any disclaimer, the term of this patent is extended or adjusted under 35 U.S.C. 154(b) by 210 days.

This patent is subject to a terminal disclaimer.

(21) Appl. No.: 13/307,690

(22) Filed: Nov. 30, 2011

(65) Prior Publication Data

US 2012/0141908 A1    Jun. 7, 2012

Related U.S. Application Data

(60) Provisional application No. 61/418,899, filed on Dec. 2, 2010.

(51) Int. Cl.
*H01M 8/10* (2006.01)

(52) U.S. Cl.
USPC ............ 429/483; 429/492; 429/482; 429/535

(58) Field of Classification Search
None
See application file for complete search history.

(56) References Cited

U.S. PATENT DOCUMENTS

| | | | |
|---|---|---|---|
| 4,191,618 A | 3/1980 | Coker et al. | |
| 4,212,714 A | 7/1980 | Coker et al. | |
| 4,333,805 A | 6/1982 | Davidson et al. | |
| 5,738,905 A | 4/1998 | Bevers | |
| 5,761,793 A | 6/1998 | Bevers | |
| 5,998,057 A | 12/1999 | Koschany et al. | |
| 6,300,381 B1 | 10/2001 | Kerres et al. | |
| 6,902,801 B2 * | 6/2005 | Charnock et al. | 428/320.2 |
| 2003/0166792 A1 | 9/2003 | Cui | |
| 2003/0187081 A1 | 10/2003 | Cui | |
| 2004/0131909 A1 | 7/2004 | Soczka-Guth et al. | |
| 2005/0147859 A1 | 7/2005 | Kiefer et al. | |
| 2005/0282053 A1 | 12/2005 | Matthew et al. | |
| 2006/0008690 A1 | 1/2006 | Uensal et al. | |

(Continued)

FOREIGN PATENT DOCUMENTS

| CN | 101523642 A | 2/2009 |
|---|---|---|
| DE | 195 09 748 A1 | 10/1996 |

(Continued)

OTHER PUBLICATIONS

U.S. Appl. No. 13/307,745, filed Nov. 30, 2011, BASF SE.

(Continued)

*Primary Examiner* — Ula C Ruddock
*Assistant Examiner* — Lisa S Park Gehrke
(74) *Attorney, Agent, or Firm* — Drinker Biddle & Reath LLP

(57) ABSTRACT

The present invention relates to a membrane electrode assembly comprising at least two electrochemically active electrodes separated by at least one polymer electrolyte membrane, the aforementioned polymer electrolyte membrane having fibrous reinforcing elements which at least partly penetrate the polymer electrolyte membrane, wherein at least some of the fibrous reinforcing elements have functional groups which have a covalent chemical bond between the fibers and the polymer of the polymer electrolyte membrane. The membrane electrode assembly is suitable for applications in fuel cells, especially in high-temperature polymer electrolyte fuel cells.

21 Claims, 1 Drawing Sheet

(56) References Cited

U.S. PATENT DOCUMENTS

| | | |
|---|---|---|
| 2009/0214921 A1 | 8/2009 | Uensal et al. |
| 2009/0258274 A1* | 10/2009 | Uensal et al. .................. 429/33 |
| 2010/0216051 A1 | 8/2010 | Uensal et al. |

FOREIGN PATENT DOCUMENTS

| | | | |
|---|---|---|---|
| DE | 195 09 749 A1 | 10/1996 |
| DE | 197 57 492 A1 | 7/1999 |
| EP | 1073690 A1 | 2/2001 |
| JP | 2007250452 A | 9/2007 |
| WO | WO-92/15121 A1 | 9/1992 |
| WO | WO-96/13872 A1 | 5/1996 |
| WO | WO-9720358 A1 | 6/1997 |
| WO | WO-00/26982 A2 | 5/2000 |
| WO | WO-01/18894 A2 | 3/2001 |
| WO | WO-01/64322 A1 | 9/2001 |
| WO | WO-01/64773 A1 | 9/2001 |
| WO | WO-02/36249 A1 | 5/2002 |
| WO | WO-03/075389 A1 | 9/2003 |
| WO | WO-2004/033079 A2 | 4/2004 |
| WO | WO-2004034500 A2 | 4/2004 |
| WO | WO-2005/063851 A1 | 7/2005 |
| WO | 2012/073084 | 6/2012 |

OTHER PUBLICATIONS

International Search Report for PCT/IB2011/002775 mailed Apr. 26, 2012.

International Preliminary Report for PCT/IB2011/002775 mailed Jun. 4, 2013.

* cited by examiner

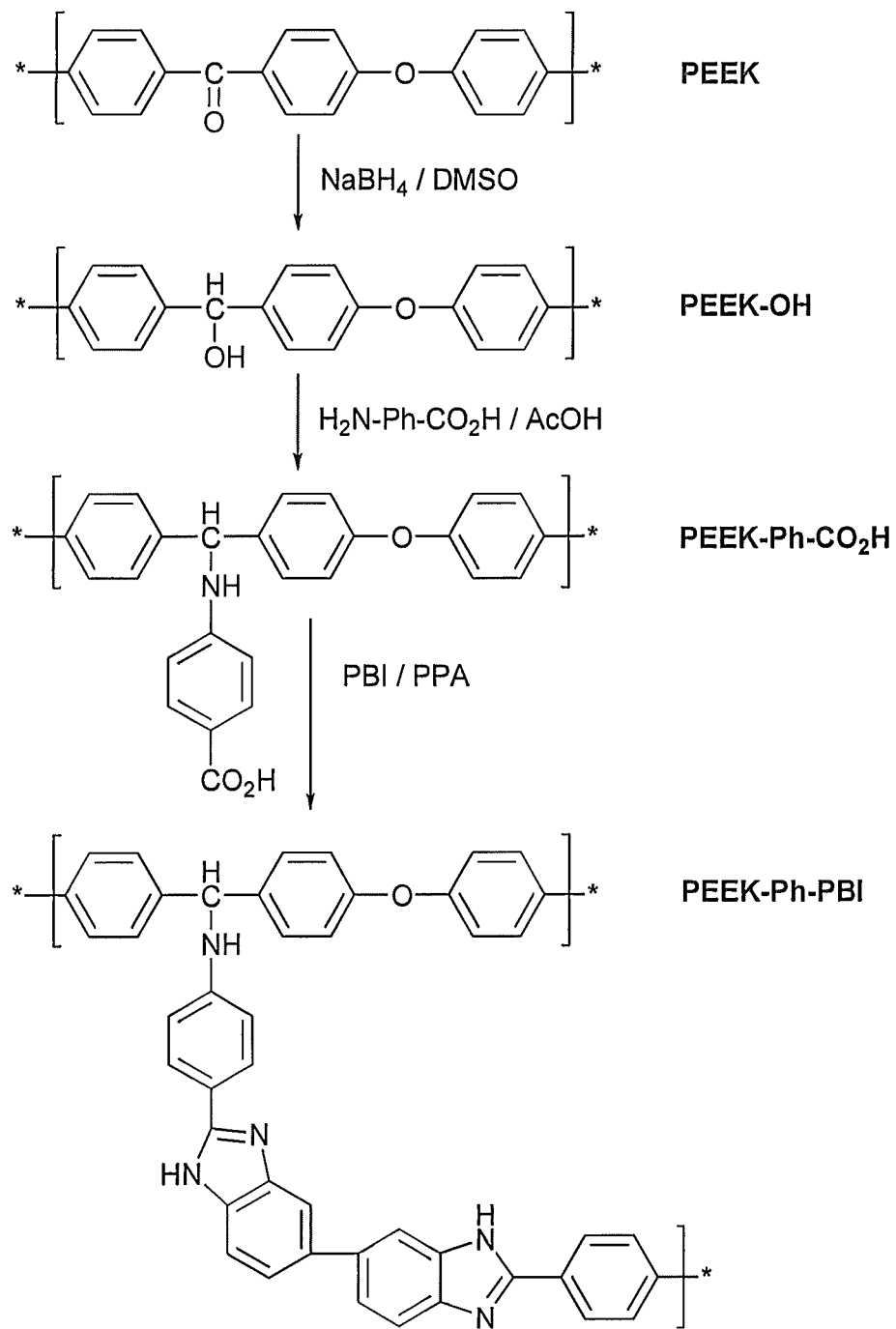

MEMBRANE ELECTRODE ASSEMBLY AND FUEL CELLS WITH IMPROVED LIFETIME

CROSS-REFERENCE TO RELATED APPLICATIONS

This application claims benefit (under 35 USC 119(e)) of U.S. Provisional Application 61/418,899, filed Dec. 2, 2010 which is incorporated by reference.

BACKGROUND OF THE INVENTION

The present invention relates to membrane electrode assemblies and to fuel cells with improved lifetime, which comprise at least two electrochemically active electrodes separated by a polymer electrolyte membrane.

Polymer electrolyte membranes (PEMs) are already known. The proton-conducting membranes used therein are at present almost exclusively sulfonic acid-modified polymers. Predominantly perfluorinated polymers are employed. A prominent example thereof is Nafion™ from DuPont de Nemours, Wilmington USA. For proton conduction, a relatively high water content in the membrane is required, which is typically 4-20 molecules of water per sulfonic acid group. The necessary water content, but also the stability of the polymer in conjunction with acidic water and the hydrogen and oxygen reaction gases, limits the operating temperature of the PEM fuel cell stack typically to 80-100° C. Under pressure, the operating temperature can be increased to >120° C. Otherwise, higher operating temperatures cannot be achieved without a loss in performance of the fuel cell.

For system reasons, however, higher operating temperatures than 100° C. in the fuel cell are desirable. The activity of the noble metal-based catalysts present in the membrane electrode assembly (MEA) is significantly better at high operating temperatures. More particularly, in the case of use of what are called reformates from hydrocarbons, considerable amounts of carbon monoxide are present in the reformer gas, which typically have to be removed by complex gas treatment or gas purification. At high operating temperatures, the tolerance of the catalysts to the CO impurities rises.

In addition, heat evolves in the operation of fuel cells. Cooling of these systems to below 80° C. can, however, be very costly and inconvenient. According to the power output, the cooling apparatuses can be made much simpler. This means that, in fuel cell systems which are operated at temperatures above 100° C., the waste heat can be utilized much better, and hence the fuel cell system efficiency can be enhanced by power-heat coupling.

In order to attain these temperatures, membranes with novel conductivity mechanisms are generally used. One approach for this purpose is the use of membranes which exhibit electrical conductivity without the use of water. The first promising development in this direction is detailed in WO 96/13872.

Since the voltage which can be tapped from a single fuel cell is relatively low, several membrane electrode assemblies are generally connected in series and are connected to one another via planar separator plates (bipolar plates). The membrane electrode assemblies and the separator plates have to be compressed with one another at comparatively high pressures in order to achieve a maximum density of the system, a maximum power and a minimum volume.

In practice, the compression of the membrane electrode assemblies with the separator plates, however, leads to problems since the polymer electrolyte membranes used have a comparatively low mechanical strength and stability and can therefore be damaged easily when compressed.

Furthermore, firstly due to the requirement for high compaction of the polymer electrolyte membrane and secondly due to the low mechanical stability thereof, it is possible only with difficulty to achieve reproducible results. Usually, the resulting fuel cell stacks have highly varying performances caused by more or less pronounced cracks in the individual membranes and/or by different degrees of compaction of the membranes. Furthermore, creeping of the electrolyte membrane is observed in long-term operation, which is attributable at least partly to the low mechanical stability.

A SUMMARY OF THE INVENTION

It was therefore an object of the present invention to provide membrane electrode assemblies and fuel cells with maximum performance, which can be produced in a very simple manner, on the industrial scale, very inexpensively and very reproducibly, and additionally have an improved lifetime.

The fuel cells should preferably have the following properties:

The fuel cells should have a maximum lifetime.
The fuel cells should be usable at maximum operating temperatures, especially above 100° C.
The individual cells in operation should exhibit the same or an improved performance over a very long period.
The fuel cells after a long operating time should have a maximum zero-load voltage and minimum gas crossover. In addition, they should be operable at minimum stoichiometry.
The fuel cells should, if at all possible, not need any additional fuel gas moistening.
The fuel cells should have the best possible resistance to permanent or varying pressure differences between anode and cathode,
More particularly, the fuel cells should be robust to different operating conditions (T, p, geometry etc.), in order to give the best possible improvement in general reliability.
Furthermore, the fuel cells should have an improved temperature and corrosion resistance and a comparatively low gas permeability, especially at high temperatures. Any decrease in mechanical stability and in structural integrity, especially at high temperatures, should be avoided as far as possible.

These objects are achieved by a fuel cell having all features of claim 1.

The present invention accordingly provides a membrane electrode assembly which comprises at least two electrochemically active electrodes separated by at least one polymer electrolyte membrane, the aforementioned polymer electrolyte membrane having fibrous reinforcing elements which at least partly penetrate the polymer electrolyte membrane, wherein at least some of the fibrous reinforcing elements have functional groups which have a covalent chemical bond between the fibers and the polymer of the polymer electrolyte membrane.

A BRIEF DESCRIPTION OF THE FIGURES

FIG. 1 illustrates the production of the functionalized PEEK sheet and of the inventive reinforced membrane

A DETAILED DESCRIPTION OF THE INVENTION

The polymer electrolyte membranes suitable for the purposes of the present invention are known per se. Preference is given to using membranes which comprise acids, which may also be bonded covalently to the polymers.

Preferably, basic polymers constitute the polymer in the polymer electrolyte membrane. These membranes comprise acids or are doped with acids, such that an acid-base complex forms between the basic polymer and the acid. Useful basic polymer membranes of this kind include virtually all known polymer membranes in which the protons can be transported. Preference is given here to acids which can convey protons without additional water, for example by means of what is called the Grotthus mechanism.

The basic polymer used in the context of the present invention is preferably a basic polymer with at least one nitrogen, oxygen or sulfur atom, preferably at least one nitrogen atom, in one repeat unit. In addition, preference is given to basic polymers comprising at least one heteroaryl group.

In a preferred embodiment, the repeat unit in the basic polymer comprises an aromatic ring with at least one nitrogen atom. The aromatic ring is preferably a five- or six-membered ring which has one to three nitrogen atoms and may be fused to another ring, especially another aromatic ring.

In a particular aspect of the present invention, polymers which are of high thermal stability and which comprise at least one nitrogen, oxygen and/or sulfur atom in one repeat unit or in different repeat units are used.

In the context of the present invention, a polymer of high thermal stability is one which can be operated over a prolonged period as a polymeric electrolyte in a fuel cell at temperatures above 120° C. "Over a prolonged period" means that an inventive membrane can be operated for at least 100 hours, preferably at least 500 hours, at at least 80° C., preferably at least 120° C., more preferably at least 160° C., without any decrease in the power, which can be measured by the method described in WO 01/18894 A2, by more than 50%, based on the starting power.

In the context of the present invention, it is possible to use all aforementioned polymers individually or as a mixture (blend), including with other polymers. Preference is given here especially to blends comprising polyazoles and/or polysulfones. The preferred blend components are polyether sulfone, polyether ketone and polymers modified with sulfonic acid groups, as described in international publications WO 02/36249 and WO 2004/034500.

In addition, particularly useful polymer blends for the purposes of the present invention have also been found to be those which comprise at least one basic polymer and at least one acidic polymer, preferably in a weight ratio of 1:99 to 99:1 (called acid-base polymer blends). Acidic polymers particularly suitable in this context comprise polymers which have sulfonic acid and/or phosphonic acid groups. Acid-based polymer blends which are very particularly suitable in accordance with the invention are described in detail, for example, in publication EP1073690 A1.

A particularly preferred group of basic polymers is that of polyazoles. A basic polymer based on polyazole comprises repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

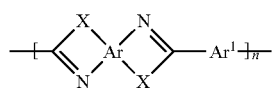

(I)

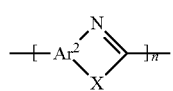

(II)

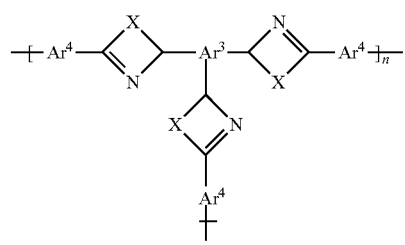

(III)

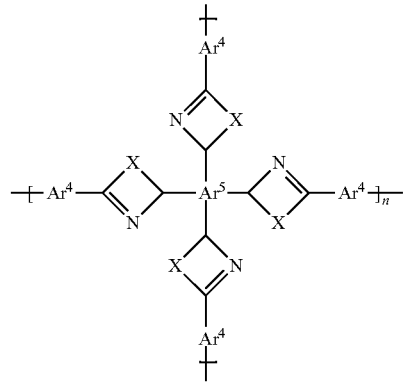

(IV)

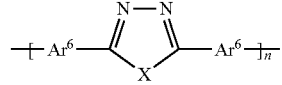

(V)

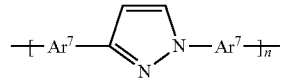

(VI)

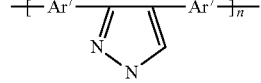

(VII)

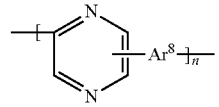

(VIII)

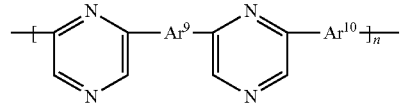

(IX)

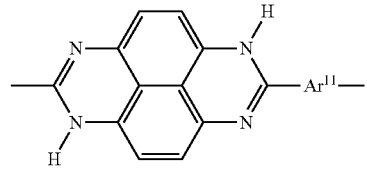

(X)

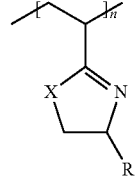

(XI)

in which
Ar are the same or different and are each a tetravalent aromatic or heteroaromatic group which may be mono- or polycyclic,
$Ar^1$ are the same or different and are each a divalent aromatic or heteroaromatic group which may be mono- or polycyclic,
$Ar^2$ are the same or different and are each a di- or trivalent aromatic or heteroaromatic group which may be mono- or polycyclic,
$Ar^3$ are the same or different and are each a trivalent aromatic or heteroaromatic group which may be mono- or polycyclic,
$Ar^4$ are the same or different and are each a trivalent aromatic or heteroaromatic group which may be mono- or polycyclic,
$Ar^5$ are the same or different and are each a tetravalent aromatic or heteroaromatic group which may be mono- or polycyclic,
$Ar^6$ are the same or different and are each a divalent aromatic or heteroaromatic group which may be mono- or polycyclic,
$Ar^7$ are the same or different and are each a divalent aromatic or heteroaromatic group which may be mono- or polycyclic,
$Ar^8$ are the same or different and are each a trivalent aromatic or heteroaromatic group which may be mono- or polycyclic,
$Ar^9$ are the same or different and are each a di- or tri- or tetravalent aromatic or heteroaromatic group which may be mono- or polycyclic,
$Ar^{10}$ are the same or different and are each a di- or trivalent aromatic or heteroaromatic group which may be mono- or polycyclic,
$Ar^{11}$ are the same or different and are each a divalent aromatic or heteroaromatic group which may be mono- or polycyclic,
X is the same or different and is oxygen, sulfur or an amino group which bears a hydrogen atom, a group having 1-20 carbon atoms, preferably a branched or unbranched alkyl or alkoxy group, or an aryl group as further radical,
R is the same or different and is hydrogen, an alkyl group or an aromatic group and, in formula (XX), is an alkylene group or an aromatic group, with the proviso that R in formula (XX) is not hydrogen, and
n, m is an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetraazapyrenes).

In a further embodiment of the present invention, the polymer comprising repeat azole units is a copolymer or a blend which comprises at least two units of the formulae (I) to (XXII) which differ from one another. The polymers may be in the form of block copolymers (diblock, triblock), random copolymers, periodic copolymers and/or alternating polymers.

In a particularly preferred embodiment of the present invention, the polymer comprising repeat azole units is a polyazole which comprises only units of the formula (I) and/or (II).

The number of repeat azole units in the polymer is preferably an integer greater than or equal to 10. Particularly preferred polymers comprise at least 100 repeat azole units.

In the context of the present invention, preference is given to polymers comprising repeat benzimidazole units. Some examples of the highly appropriate polymers comprising repeat benzimidazole units are represented by the following formulae:

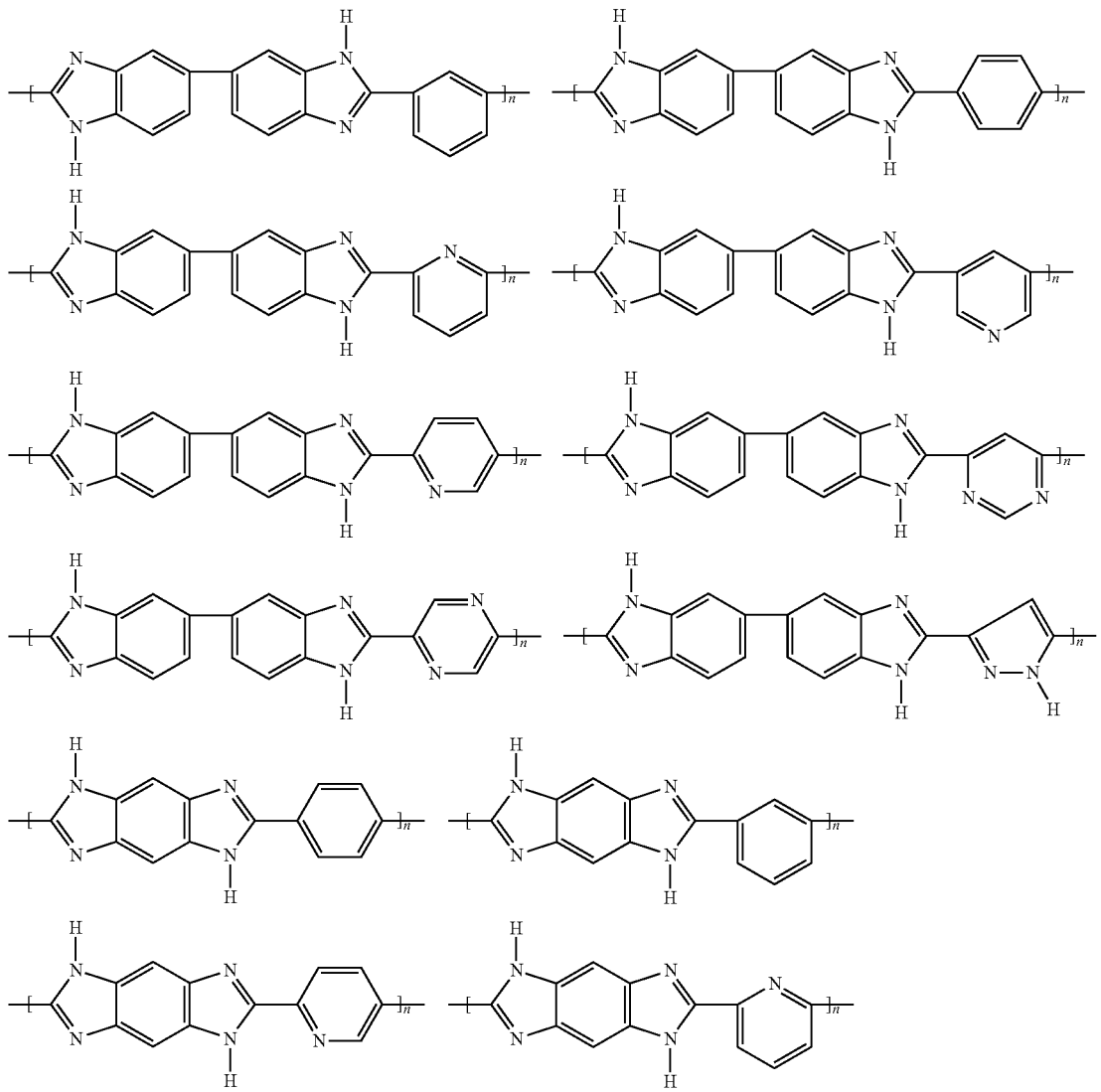

-continued

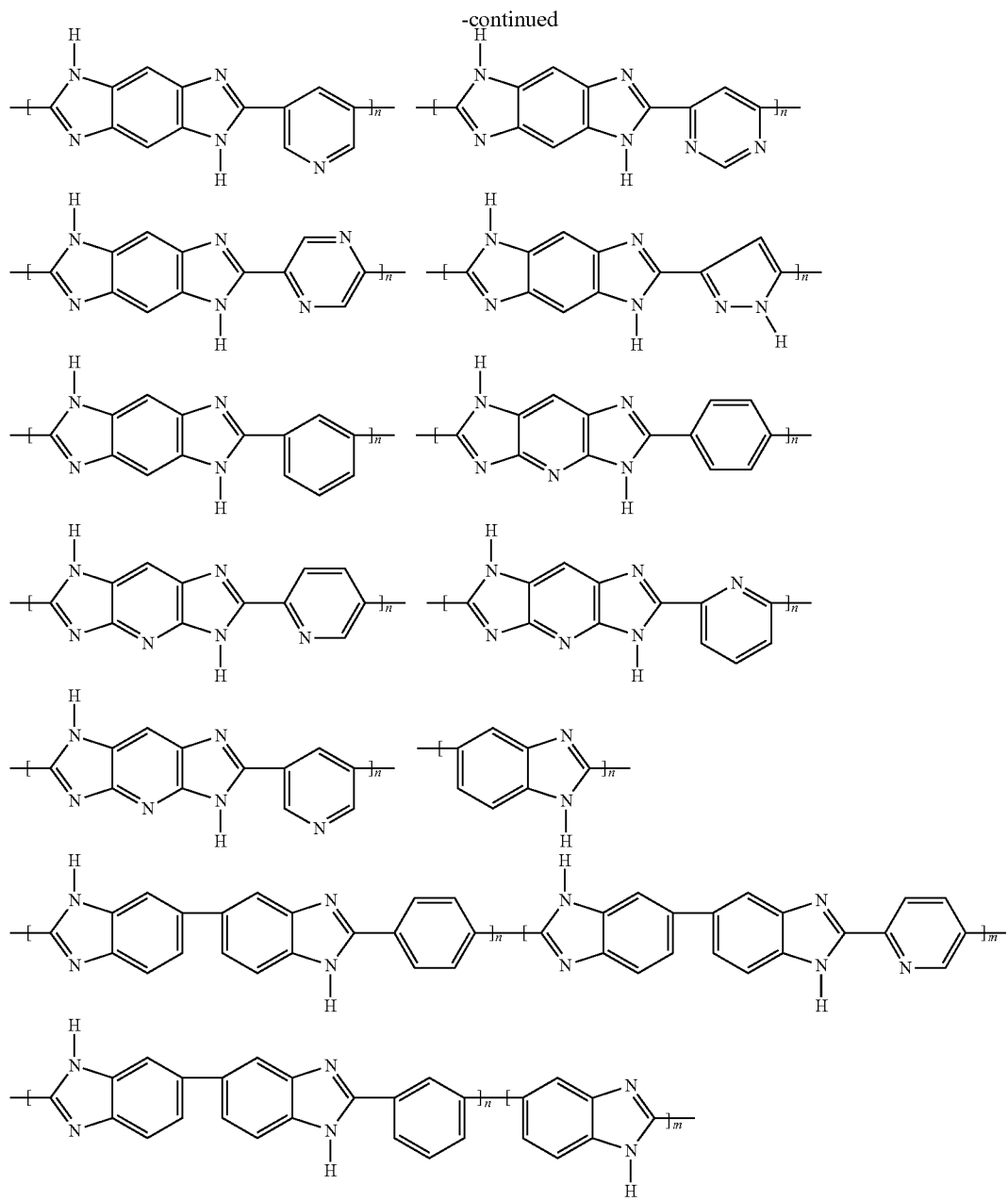

where n and m are each integers greater than or equal to 10, preferably greater than or equal to 100. In the benzimidazoles shown above, it is also possible for one or more nitrogen heteroatoms to be replaced by other heteroatoms; these other heteroatoms are preferably oxygen and/or sulfur atoms. Such compounds are likewise covered by the term benzimidazole.

The polyazoles used, but especially the polybenzimidazoles, are notable for a high molecular weight. Measured as the intrinsic viscosity, it is at least 0.2 dl/g, preferably 0.8 to 10 dl/g, especially 1 to 10 dl/g.

Preferred polybenzimidazoles are commercially available under the Celazole® trade name.

The preferred polysulfones include, more particularly, polysulfones with aromatic and/or heteroaromatic groups in the main chain. In a particular aspect of the present invention, preferred polysulfones and polyether sulfones have a melt volume flow rate MVR 300/21.6 less than or equal to 40 cm³/10 min, especially less than or equal to 30 cm³/10 min and more preferably less than or equal to 20 cm³/10 min, measured to ISO 1133. Preference is given here to polysulfones having a Vicat softening temperature VST/A/50 of 180° C. to 230° C. In another preferred embodiment of the present invention, the number-average molecular weight of the polysulfones is greater than 30 000 g/mol.

The polymers based on polysulfone include especially polymers which have repeat units with linking sulfone groups according to the general formulae A, B, C, D, E, F and/or G:

 (A)

 (B)

-continued

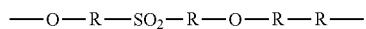
(C)

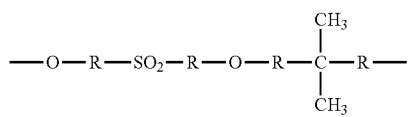
(D)

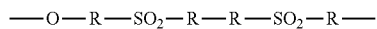
(E)

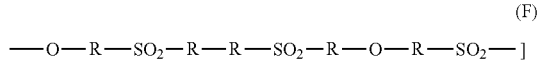
(F)

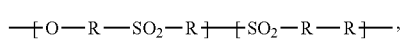
(G)

in which the R radicals are the same or different and are each independently an aromatic or heteroaromatic group, these radicals having been elucidated in detail above. These include especially 1,2-phenylene, 1,3-phenylene, 1,4-phenylene, 4,4'-biphenyl, pyridine, quinoline, naphthalene, phenanthrene.

The polysulfones preferred in the context of the present invention include homo- and copolymers, for example random copolymers. Particularly preferred polysulfones comprise repeat units of the formulae H to N:

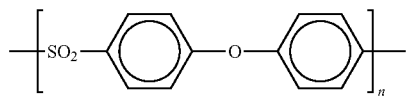
(H)

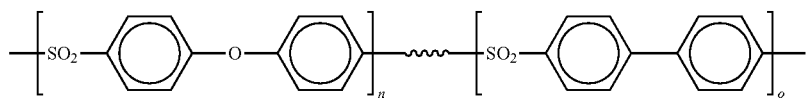
(I)

where n>o

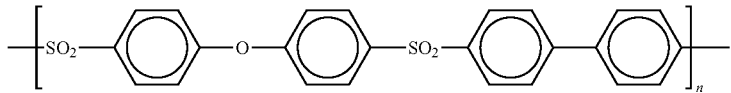
(J)

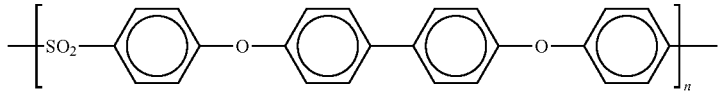
(K)

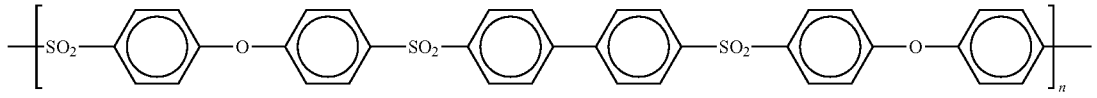
(L)

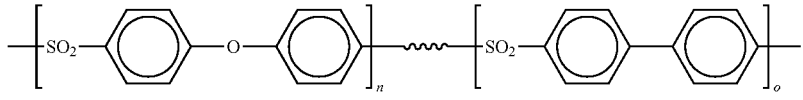
(M)

where n<o

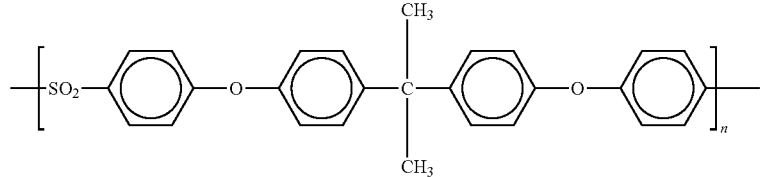
(N)

The above-described polysulfones can be obtained commercially under the ®Victrex 200 P, ®Victrex 720 P, ®Ultrason E, ®Ultrason S, ®Mindel, ®Radel A, ®Radel R, ®Victrex HTA, ®Astrel and ®Udel trade names.

In addition, particular preference is given to polyether ketones, polyether ketone ketones, polyether ether ketones, polyether ether ketone ketones and polyaryl ketones. These high-performance polymers are known per se and can be obtained commercially under the Victrex® PEEK™, ®Hostatec, ®Kadel trade names.

According to the present invention, the polymer electrolyte membrane has reinforcing elements which at least partly penetrate the polymer electrolyte membrane, i.e. at least partly penetrate into the polymer electrolyte membrane. More preferably, the reinforcing elements are predominantly embedded in the membrane and only isolated elements, if any, project out of it. The membranes reinforced in accordance with the invention cannot now be delaminated without destruction.

This should be distinguished from laminar structures in which the polymer electrolyte membrane and the reinforcing elements each form separate layers which are joined to one another but do not penetrate one another. Such laminar structures are likewise encompassed within the context of the present invention.

According to the invention, the polymer electrolyte membrane is fiber-reinforced and the reinforcing elements comprise preferably monofilaments, multifilaments, long and/or short fibers, hybrid yarns and/or bicomponent fibers. In addition to a reinforcing element formed from specific fibers, the reinforcing element may also form a textile fabric. Suitable textile fabrics are nonwovens, wovens, loop-drawn knits, loop-formed knits, felts, laids and/or meshes, more preferably laids, wovens and/or nonwovens.

Wovens refer to products formed from filaments of monofils and/or multifilament yarns crossing predominantly at right angles. The mesh size of the textile fabric may typically be 20 to 2000 μm; for the purposes of the present invention, textile fabrics, especially wovens, laids and meshes, with a mesh size in the range from 30 to 300 μm have been found to be particularly useful. The mesh size can be determined, for example, by electronic image analysis of an optical or TEM image.

The open sieve area $a_0$ of the textile fabric, especially of the woven, laid and mesh, may typically be within the range of 0.1 to 98%, preferably within the range of 20 to 80%. It can be determined via the relationship $$a_0[\%] = \frac{(w)^2 \times 100}{(w+d)^2}$$

where d denotes the yarn diameter and w the mesh size.

The sieve fineness n of the woven may typically be in the range from 8 to 40 n/cm, but preferably in the range from 50 to 90 n/cm. It can be determined via the relationship $$n/cm = \frac{10000}{(w+d)}.$$

The laids/meshes typically have 7 to 140 counts/cm filaments.

The yarn diameters of the yarns or fibers which form the textile fabric, especially of the woven, may be within the range of 20-950 μm, but preferably within the range of 20 to 500 μm. It can be determined by electronic image analysis of an optical or TEM image. The minimum thickness of the reinforcing elements preferably corresponds to the total thickness of the polymer membrane.

Nonwovens refer to flexible porous fabrics which are not produced by conventional methods of weaving of warp and weft, or by mesh formation, but rather by interlooping and/or cohesive and/or adhesive bonding of fibers (e.g. spunbonded or meltblown nonwovens). Nonwovens are relatively loose materials composed of staple fibers or filaments, the cohesion of which generally results from the intrinsic adhesion of the fibers or from mechanical postconsolidation.

According to the invention, the individual fibers may have a preferential direction (oriented or cross nonwovens) or may be undirected (random nonwovens). The nonwovens can be hydrodynamically and/or mechanically consolidated by needling, intermeshing or by interlacing by means of water jets (called spunlaced nonwovens).

Adhesively consolidated nonwovens are preferably obtained by bonding the fibers with liquid binders, especially with acrylate polymers, SBR/NBR, polyvinyl ester or polyurethane dispersions, or by melting or dissolution of what are called binding fibers which were added to the nonwoven in the course of production.

In the case of cohesive consolidation, the fiber surfaces are favorably partly dissolved by suitable chemicals and bonded by pressure or welded at elevated temperature.

In a particularly preferred embodiment of the present invention, the nonwovens are further reinforced by additional threads, weaves or knits.

The basis weight of the nonwovens is favorably 30 g/m² to 500 g/m², especially 30 g/m² to 150 g/m².

The reinforcing elements which may be part of a woven, loop-drawn knit, loop-formed knit or nonwoven may have a virtually round cross section or else other shapes, for example dumbbell-shaped, kidney-shaped, triangular or multilobal cross sections. Bicomponent fibers are also possible.

The reinforcing elements preferably have a diameter in the range from 10 μm to 1000 μm, preferably in the range from 20 μm to 500 μm, more preferably in the range from 20 μm to 300 μm and especially in the range from 25 μm to 100 μm. The maximum diameter is based on the longest dimension in the cross section.

In addition, the reinforcing elements favorably have a Young's modulus of at least 5 GPa, preferably at least 10 GPa, more preferably at least 20 GPa. The elongation at break of the reinforcing elements is preferably in the range from 0.5% to 100%, more preferably in the range from 1% to 60%.

The proportion by volume of the reinforcing elements, based on the total volume of the polymer electrolyte membrane, is appropriately in the range from 5% by volume to 95% by volume, preferably in the range from 10% by volume to 80% by volume, more preferably in the range from 10% by volume to 50% by volume and especially in the range from 10% by volume to 30% by volume. It is preferably measured at 20° C.

In the context of the present invention, the reinforcing elements appropriately absorb such a force that, in the stress-strain diagram at 20° C., the relative load on the polymer electrolyte membrane with reinforcing elements, as compared with the polymer electrolyte membrane without reinforcing elements, in the range between 0 and 1% strain at at least one site, differs by at least 10%, preferably by at least 20% and most preferably by at least 30%.

Furthermore, the reinforcement is favorably such that the relative load on the polymer electrolyte membrane at room temperature (20° C.), divided by the relative load on the carrier ply at 180° C., measured at at least one point in the range between 0 and 1% strain, gives a quotient of at most 3, preferably at most 2.5, especially preferably less than 2.

The relative load is measured to EN 29073, part 3 on samples of width 5 cm with measurement length 100 mm. The numerical value of the pretensioning force, reported in centinewtons [cN], corresponds to the numerical value of the mass per unit area of the sample, reported in grams per square meter.

Suitable polymers for the inventive fibrous reinforcing elements are those polymers which can be chemically functionalized.

Polymers suitable for these fibrous reinforcing elements include polyolefins such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene (PTFE), polyhexafluoropropylene, copolymers of PTFE with hexafluoropropylene, with perfluoropropyl vinyl ether, with trifluoronitrosomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, especially those of norbornene;

polymers having C—O bonds in the backbone, for example polyacetal, polyoxymethylene, polyethers, polypropylene oxide, polyepichlorohydrin, polytetrahydrofuran, polyphenylene oxide, polyether ketone, polyesters, especially polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the backbone, for example polysulfide ethers, polyphenylene sulfide, polysulfones, polyether sulfone;

polymers having C—N bonds in the backbone, for example polyimines, polyisocyanides, polyetherimine, polyetherimides, polyaniline, polyaramids, polyamides, polyhydrazides, polyurethanes, polyimides, polyazoles, polyazole ether ketone, polyazines, polybenzoxazoles, polybenzoxazines;

liquid-crystalline polymers, especially Vectra™, and inorganic polymers, for example polysilanes, polycarbosilanes, polysiloxanes, polysilicic acid, polysilicates, silicones, polyphosphazenes and polythiazyl.

Chemical functionalization is understood to mean the introduction of a functional group which is capable of forming a covalent chemical bond between the fibers and the polymer of the polymer electrolyte membrane. Suitable functional groups are preferably amines, carboxylic acids, carboxylic esters, carboxylic anhydrides, carbonyl halides, carboxamides, acetals, alcohols, ethers, sulfonyl halides and halides.

Preferred polymers for the fibrous reinforcing elements are polyether ketones (PEKs), polyether ether ketones (PEEKs), polysulfones, polyether sulfones, polyazoles, polyacrylonitriles (PANs), polyphosphazenes, polyphenylene oxide, polyether imides and polyaramids.

The aforementioned polymers are functionalized, preferably in the form of fibers thereof. For this purpose, the polymer is first nitrated and then reduced to the amine, or the polymer is first carboxylated in order then to be hydrolyzed to the corresponding carboxylic ester. Suitable procedures are described, for example, in WO 01/64322 and WO 01/64773.

The fibrous reinforcements thus have functional groups which are capable of reaction with the polymer of the polymer electrolyte membrane or, in the case of further degradation of the polymers, react therewith and form a covalent bond between the polymer of the fibrous reinforcement and the polymer of the polymer electrolyte membrane. It is thus advantageous when the polymer electrolyte membrane still has monomeric and/or oligomeric constituents (in each case min. 1% by weight).

The polymer electrolyte membranes can be produced in a manner known per se, and they are appropriately provided directly with the reinforcing elements during the production thereof, preferably by forming the polymer electrolyte membrane in the presence of the reinforcing elements and, in doing so, arranging them such that they at least partly penetrate the polymer electrolyte membrane.

In a preferred variant of the present invention, doped polyazole films are obtained by a process comprising the steps of A) mixing (i) one or more aromatic tetraamino compounds with (ii) one or more aromatic carboxylic acids or esters thereof which comprise at least two acid groups per carboxylic acid monomer, or (iii) mixing one or more aromatic and/or (iv) heteroaromatic diaminocarboxylic acids, in polyphosphoric acid to form a solution and/or dispersion, B) arranging fibrous reinforcing elements on a carrier, said fibrous reinforcing elements having at least one functional group selected from aminos, carboxylic acid, carboxylic ester or mixtures thereof, C) applying a layer using the mixture according to step A) to the carrier from step B) in such a way that the reinforcing elements at least partly penetrate the mixture, D) heating the flat structure/layer obtainable according to step C) under inert gas to temperatures of up to 350° C., preferably up to 280° C., to form the polyazole polymer, the latter forming covalent chemical bonds to the functional group of the fibrous reinforcing elements, E) treating the membrane formed in step D) (until it is self-supporting).

This variant requires the use of reinforcing elements whose melting point is above the temperature range specified in step D) and which have sufficient stability toward polyphosphoric acid or phosphoric acid.

In addition, it is also possible to omit step B) and to perform the supply of the reinforcing elements before or during step D). According to the characteristics of the materials, the reinforcing elements can also be provided by means of a calender, which is optionally heated. In this case, the reinforcement is pressed into the still-ductile base material.

Such a procedure, but without the incorporation of reinforcing elements, is described, for example, in WO 2004/033079, from which the person skilled in the art can take further valuable hints with regard to steps A), C), D) and E). The corresponding membranes without reinforcing elements are obtainable, for example, under the Celtec® trade name.

The aromatic or heteroaromatic carboxylic acid compounds for use in step A) preferably comprise dicarboxylic acids and tricarboxylic acids and tetracarboxylic acids, or esters thereof or anhydrides thereof or acid chlorides thereof. The term "aromatic carboxylic acids" likewise also comprises heteroaromatic carboxylic acids.

The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid, or the C1-C20-alkyl esters or C5-C12-aryl esters thereof or the acid anhydrides thereof or the acid chlorides thereof.

The aromatic tri-, tetracarboxylic acids or the C1-C20-alkyl esters or C5-C12-aryl esters thereof or the acid anhydrides thereof or the acid chlorides thereof are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid or 3,5,4'-biphenyltricarboxylic acid.

The aromatic tetracarboxylic acids or the C1-C20-alkyl esters or C5-C12-aryl esters thereof or the acid anhydrides thereof or the acid chlorides thereof are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid or 1,4,5,8-naphthalenetetracarboxylic acid.

The heteroaromatic carboxylic acids used are preferably heteroaromatic dicarboxylic acids or tricarboxylic acids or tetracarboxylic acids, or the esters thereof or the anhydrides thereof. Heteroaromatic carboxylic acids are understood to mean aromatic systems which contain at least one nitrogen, oxygen, sulfur or phosphorus atom in the aromatic ring. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid or benzimidazole-5,6-dicarboxylic acid, or the C1-C20-alkyl esters or C5-C12-aryl esters thereof, or the acid anhydrides thereof or the acid chlorides thereof.

The content of tricarboxylic acid or tetracarboxylic acid (based on the dicarboxylic acid used) is between 0 and 30 mol %, preferably 0.1 and 20 mol %, especially 0.5 and 10 mol %.

The aromatic and heteroaromatic diaminocarboxylic acids used are preferably diaminobenzoic acid or the mono- and dihydrochloride derivatives thereof.

Preferably, mixtures of at least 2 different aromatic carboxylic acids are used. Particular preference is given to using mixtures which comprise, as well as aromatic carboxylic acids, also heteroaromatic carboxylic acids. The mixing ratio of aromatic carboxylic acids to heteroaromatic carboxylic acids is between 1:99 and 99:1, preferably 1:50 to 50:1.

These mixtures are especially mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The tetraamino compounds for use in step A) preferably comprise 3,3',4,4'-tetraaminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetraaminobenzophenone, 3,3',4,4'-tetraaminodiphenylmethane and 3,3',4,4'-tetraaminodiphenyldimethylmethane and salts thereof, especially the mono-, di-, tri- and tetrahydrochloride derivatives thereof.

The polyphosphoric acid used in step A) comprises commercial polyphosphoric acids as obtainable, for example, from Riedel-de Haen. The polyphosphoric acids $H_{n+2}P_nO_{3n+1}$ (n>1) typically have a content, calculated as $P_2O_5$ (by acidimetry) of at least 83%. Instead of a solution of the monomers, it is also possible to produce a dispersion/suspension.

The mixture obtained in step A) has a weight ratio of polyphosphoric acid to the sum of all monomers of 1:10 000 to 10 000:1, preferably 1:1000 to 1000:1, especially 1:100 to 100:1.

The layer is formed in step C) by means of measures known per se (casting, spraying, knife-coating), which are known from the prior art for polymer film production. Suitable carriers are all carriers which can be described as inert under the conditions. To adjust the viscosity, phosphoric acid (conc. phosphoric acid, 85%) can optionally be added to the solution. This can adjust the viscosity to the desired value and facilitate the formation of the membrane.

The layer obtained in step C) has a thickness between 20 and 4000 µm, preferably between 30 and 3500 µm, especially between 50 and 3000 µm.

When the mixture according to step A) also comprises tricarboxylic acids or tetracarboxylic acid, this achieves branching/crosslinking of the polymer formed. This contributes to improvement of the mechanical character.

The treatment of the polymer layer obtained according to step D) is performed in the presence of moisture at temperatures and for a duration sufficient for the layer to have sufficient strength for use in fuel cells. The treatment may be to such an extent that the membrane is self-supporting, such that it can be detached from the carrier without damage.

According to step D), the flat structure obtained in step C) is heated to a temperature of up to 350° C., preferably up to 280° C. and more preferably in the range from 200° C. to 250° C. The inert gases for use in step D) are known in the technical field. These include especially nitrogen, and noble gases such as neon, argon, helium.

In one variant of the process, heating of the mixture from step A) to temperatures of up to 350° C., preferably up to 280° C., can already bring about the formation of oligomers and/or low molecular weight polymers. Depending on the temperature and duration selected, it is subsequently possible to partially or entirely dispense with the heating in step D). This variant too forms part of the subject matter of the present invention.

The membrane is treated in step E) at temperatures above 0° C. and less than 150° C., preferably at temperatures between 10° C. and 120° C., especially between room temperature (20° C.) and 90° C., in the presence of moisture or water and/or water vapor and/or water-comprising phosphoric acid of up to 85%. The treatment is effected preferably under standard pressure, but can also be effected under pressure. It is essential that the treatment occurs in the presence of sufficient moisture, as a result of which the polyphosphoric acid present contributes to reinforcement of the membrane as a result of partial hydrolysis to form low molecular weight polyphosphoric acid and/or phosphoric acid.

The partial hydrolysis of the polyphosphoric acid in step E) leads to a reinforcement of the membrane and to a decrease in the layer thickness and formation of a membrane with a thickness between 15 and 3000 μm, preferably between 20 and 2000 μm, especially between 20 and 1500 μm, which is self-supporting.

The intra- and intermolecular structures (interpenetrating networks, IPN) present in the polyphosphoric acid layer according to step C) lead, in step C), to ordered membrane formation which is found to be responsible for the special properties of the membrane formed.

The upper temperature limit of the treatment according step E) is generally 150° C. In the case of extremely brief action of moisture, for example of superheated steam, this vapor may also be hotter than 150° C. The essential factor for the upper temperature limit is the duration of the treatment.

The partial hydrolysis (step E) can also be effected in climate-controlled chambers in which the hydrolysis can be controlled under defined action of moisture. In this case, the moisture content can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time depends on the thickness of the membrane.

In general, the treatment time is between a few seconds and minutes, for example under the action of superheated steam, or up to whole days, for example under air at room temperature and low relative air humidity. The treatment time is preferably between 10 seconds and 300 hours, especially 1 minute to 200 hours.

When the partial hydrolysis is performed at room temperature (20° C.) with ambient air of relative air humidity 40-80%, the treatment time is between 1 and 200 hours.

The membrane obtained according to step E) can be configured so as to be self-supporting, i.e. it can be detached without damage from the carrier and then optionally processed further directly.

It is possible to adjust the concentration of phosphoric acid and hence the conductivity of the polymer membrane via the degree of hydrolysis, i.e. the time, temperature and ambient humidity. The concentration of phosphoric acid is reported as moles of acid per mole of repeat unit of the polymer. The process comprising steps A) to E) can give membranes with a particularly high phosphoric acid concentration. Preference is given to a concentration (moles of phosphoric acid based on one repeat unit of the formula (I), for example polybenzimidazole) between 10 and 50, especially between 12 and 40. Such high degrees of doping (concentrations) are obtainable only with very great difficulty, if at all, by doping of polyazoles with commercially available orthophosphoric acid.

An advantageous modification of the above-described process, in which doped polyazole films are produced by the use of polyphosphoric acid, comprises the steps of
1) reacting one or more aromatic tetraamino compounds with one or more aromatic carboxylic acids or esters thereof which comprise at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained according to step 1) in polyphosphoric acid,
3) arranging fibrous reinforcing elements on a carrier, said fibrous reinforcing elements having at least one functional group selected from amino, carboxylic acid, carboxylic ester or mixtures thereof,
4) impregnating the fibrous reinforcing elements with a solution according to step 2) and heating under inert gas to temperatures of up to 300° C., preferably up to 280° C., to form the dissolved polyazole polymer, the latter forming covalent chemical bonds to the functional group of the fibrous reinforcing elements,
5) treating the membrane formed in step 4) until it is self-supporting.

The process steps described under points 1) to 5) have been explained in detail above for steps A) to E), and reference is made thereto, especially with regard to preferred embodiments.

In addition, such a procedure, but without the incorporation of reinforcing elements, is, for example, described in WO 2004/033079, from which the person skilled in the art can take further valuable hints with regard to steps 1)-5). The corresponding membranes without reinforcing elements are available, for example, under the Celtec® trade name.

In yet a further particularly preferred variant of the present invention, doped polyazole films are obtained by a process in which some or all of the polyphosphoric acid is replaced by organic phosphonic anhydrides. Such a procedure, but without the incorporation of reinforcing elements, is described, for example, in WO 2005/063851.

The aforementioned organic phosphonic anhydrides are cyclic compounds of the formula

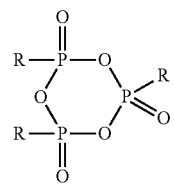

or linear compounds of the formula

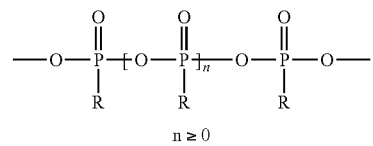

$n \geq 0$ or anhydrides of the multiple organic phosphonic acids, for example of the formula of anhydrides of diphosphonic acid

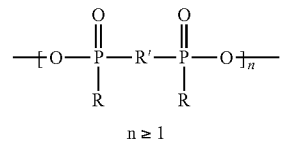

$n \geq 1$ in which the R and R' radicals are the same or different and are each a $C_1$-$C_{20}$ group.

In the context of the present invention, a $C_1$-$C_{20}$ group is preferably understood to mean the $C_1$-$C_{20}$-alkyl radicals, more preferably methyl, ethyl, n-propyl, i-propyl, n-butyl, i-butyl, s-butyl, t-butyl, n-pentyl, s-pentyl, cyclopentyl, n-hexyl, cyclohexyl, n-octyl or cyclooctyl, $C_1$-$C_{20}$-alkenyl, more preferably ethenyl, propenyl, butenyl, pentenyl, cyclopentenyl, hexenyl, cyclohexenyl, octenyl or cyclooctenyl, $C_1$-$C_{20}$-alkynyl, more preferably ethynyl, propynyl, butynyl, pentynyl, hexynyl or octynyl, $C_6$-$C_{20}$-aryl, more preferably phenyl, biphenyl, naphthyl or anthracenyl, $C_1$-$C_{20}$-fluoroalkyl, more preferably trifluoromethyl, pentafluoroethyl or 2,2,2-trifluoroethyl, $C_6$-$C_{20}$-aryl, more preferably phenyl, biphenyl, naphthyl, anthracenyl, triphenylenyl, [1,1';3',1"]terphenyl-2'-yl, binaphthyl or phenanthrenyl, $C_6$-$C_{20}$-fluoroaryl, more preferably tetrafluorophenyl or heptafluoronaphthyl, $C_1$-$C_{20}$-alkoxy, more preferably methoxy, ethoxy, n-propoxy, i-propoxy, n-butoxy, i-butoxy, s-butoxy or t-butoxy, $C_6$-$C_{20}$-aryloxy, more preferably phenoxy, naphthoxy, biphenyloxy, anthracenyloxy, phenanthrenyloxy, $C_7$-$C_{20}$-arylalkyl, more preferably o-tolyl, m-tolyl, p-tolyl, 2,6-dimethylphenyl, 2,6-diethylphenyl, 2,6-di-i-propylphenyl, 2,6-di-t-butylphenyl, o-t-butylphenyl, m-t-butylphenyl, p-t-butylphenyl, $C_7$-$C_{20}$-alkylaryl, more preferably benzyl, ethylphenyl, propylphenyl, diphenylmethyl, triphenylmethyl or naphthalenylmethyl, $C_7$-$C_{20}$-aryloxyalkyl, more preferably o-methoxyphenyl, m-phenoxymethyl, p-phenoxymethyl, $C_{12}$-$C_{20}$-aryloxyaryl, more preferably p-phenoxyphenyl, $C_5$-$C_{20}$-heteroaryl, more preferably 2-pyridyl, 3-pyridyl, 4-pyridyl, quinolinyl, isoquinolinyl, acridinyl, benzoquinolinyl or benzoisoquinolinyl, $C_4$-$C_{20}$-heterocycloalkyl, more preferably furyl, benzofuryl, 2-pyrolidinyl, 2-indolyl, 3-indolyl, 2,3-dihydroindolyl, $C_8$-$C_{20}$-arylalkenyl, more preferably o-vinylphenyl, m-vinylphenyl, p-vinylphenyl, $C_8$-$C_{20}$-arylalkynyl, more preferably o-ethynylphenyl, m-ethynyl phenyl or p-ethynylphenyl, $C_2$-$C_{20}$ heteroatom-containing group, more preferably carbonyl, benzoyl, oxybenzoyl, benzoyloxy, acetyl, acetoxy or nitrile, and one or more $C_1$-$C_{20}$ groups may form a cyclic system.

In the aforementioned $C_1$-$C_{20}$ groups, one or more nonadjacent $CH_2$ groups may be replaced by —O—, —S—, —$NR^1$— or —$CONR^2$—, and one or more hydrogen atoms may be replaced by F.

In the aforementioned $C_1$-$C_{20}$ groups which may have aromatic systems, one or more nonadjacent CH groups may be replaced by —O—, —S—, —$NR^1$— or —$CONR^2$—, and one or more hydrogen atoms may be replaced by F.

The $R^1$ and $R^2$ radicals are the same or different at each instance and are H or an aliphatic or aromatic hydrocarbyl radical having 1 to 20 carbon atoms.

Particular preference is given to organic phosphonic anhydrides which are partly fluorinated or perfluorinated.

The organic phosphonic anhydrides used can also be used in combination with polyphosphoric acid and/or with $P_2O_5$. The polyphosphoric acid is commercial polyphosphoric acid, as obtainable, for example, from Riedel-de Haen. The polyphosphoric acids $H_{n+2}P_nO_{3n+1}$ (n>1) typically have a content, calculated as $P_2O_5$ (by acidimetry) of at least 83%. Instead of a solution of the monomers, it is also possible to obtain a dispersion/suspension.

The organic phosphonic anhydrides can also be used in combination with single and/or multiple organic phosphonic acids.

The single and/or multiple organic phosphonic acids are compounds of the formula

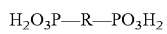

in which the R radical is the same or different and is a $C_1$-$C_{20}$ group, and n>2. Particularly preferred R radicals have already been described above.

The organic phosphonic acids are commercially available, for example the products from Clariant or Aldrich.

The organic phosphonic acids do not comprise any vinylic phosphonic acids, as described in international publication WO 03/075389.

The mixture obtained has a weight ratio of organic phosphonic anhydrides to the sum of all polymers of 1:10 000 to 10 000:1, preferably 1:1000 to 1000:1, especially 1:100 to 100:1. When these phosphonic anhydrides are used in a mixture with polyphosphoric acid or single and/or multiple organic phosphonic acids, these should be considered in respect of the phosphonic anhydrides.

In addition, further organophosphonic acids, preferably perfluorinated organic phosphonic acids, can be added to the mixture obtained.

The membrane, especially the membrane based on polyazoles, can also be crosslinked at the surface by the action of heat in the presence of atmospheric oxygen. This curing of the membrane surface additionally improves the properties of the membrane. For this purpose, the membrane can be heated to a temperature of at least 150° C., preferably at least 200° C. and more preferably at least 250° C. The oxygen concentration in this process step is typically within the range from 5 to 50% by volume, preferably 10 to 40% by volume, without any intention that this should impose a restriction.

The crosslinking can also be effected by the action of IR or NIR (IR=InfraRed, i.e. light with a wavelength of more than 700 nm; NIR=Near IR, i.e. light with a wavelength in the range from approx. 700 to 2000 nm, or an energy in the range from approx. 0.6 to 1.75 eV). A further method is irradiation with β rays. The radiation dose here is between 5 and 200 kGy.

According to the desired degree of crosslinking, the duration of the crosslinking reaction may be within a wide range. In general, this reaction time is in the range from 1 second to 10 hours, preferably 1 minute to 1 hour, without any intention that this should impose a restriction.

According to the invention, the membrane electrode assembly comprises at least two electrochemically active electrodes (anode and cathode) separated by the polymer electrolyte membrane. The term "electrochemically active" indicates that the electrodes are capable of catalyzing the oxidation of hydrogen and/or at least one reformate and the reduction of oxygen. This property can be obtained by coating the electrodes with platinum and/or ruthenium. The term "electrode" means that the material is electrically conductive. The electrode may optionally have a noble metal layer. Such electrodes are known and are described, for example, in U.S. Pat. No. 4,191,618, U.S. Pat. No. 4,212,714 and U.S. Pat. No. 4,333,805.

The electrodes preferably comprise gas diffusion layers which are in contact with a catalyst layer.

The gas diffusion layers used are typically flat, electrically conductive and acid-resistant structures. Examples of these include graphite fiber papers, carbon fiber papers, woven graphite sheet and/or papers which have been rendered conductive by addition of carbon black. These layers achieve fine distribution of the gas and/or liquid streams.

In addition, it is also possible to use gas diffusion layers which comprise a mechanically stable support material impregnated with at least one electrically conductive material, e.g. carbon (for example carbon black). Support materials particularly suitable for these purposes comprise fibers, for example in the form of nonwovens, papers or wovens, especially carbon fibers, glass fibers or fibers comprising organic polymers, for example polypropylene, polyester (polyethylene terephthalate), polyphenylene sulfide or polyether ketones. Further details of such diffusion layers can be taken, for example, from WO 9720358.

The gas diffusion layers preferably have a thickness in the range from 80 µm to 2000 µm, especially in the range from 100 µm to 1000 µm and more preferably in the range from 150 µm to 500 µm.

In addition, the gas diffusion layers favorably have a high porosity. This is preferably in the range from 20% to 80%.

The gas diffusion layers may comprise customary additives. These include fluoropolymers, for example polytetrafluoroethylene (PTFE) and surface-active substances.

In a particular embodiment, at least one of the gas diffusion layers may consist of a compressible material. In the context of the present invention, a compressible material is characterized by the property that the gas diffusion layer can be compressed by pressure, without losing its integrity, to half, especially to one third, of its original thickness.

This property is generally possessed by gas diffusion layers composed of woven graphite sheet and/or paper which has been rendered conductive by addition of carbon black.

The catalytically active layer comprises a catalytically active substance. These include noble metals, especially platinum, palladium, rhodium, iridium and/or ruthenium. These substances can also be used in the form of alloys with one another. In addition, these substances can also be used in an alloy with base metals, for example Cr, Zr, Ni, Co and/or Ti. In addition, it is also possible to use the oxides of the aforementioned noble metals and/or base metals. Typically, the abovementioned metals are used by known methods on a support material, usually carbon with high specific surface area, in the form of nanoparticles.

In a particular aspect of the present invention, the catalytically active compounds, i.e. the catalysts, are used in the form of particles which preferably have a size in the range from 1 to 1000 nm, especially 5 to 200 nm and preferably 10 to 100 nm.

In a particular embodiment of the present invention, the weight ratio of fluoropolymer to catalyst material, comprising at least one noble metal and optionally one or more support materials, is greater than 0.05, and this ratio is preferably in the range from 0.1 to 0.6.

In a particular embodiment of the present invention, the catalyst layer has a thickness in the range from 1 to 1000 µm, especially from 5 to 500 µm, preferably from 10 to 300 µm. This value is a mean value which can be determined by measuring the layer thickness in the cross section of images which can be obtained with a scanning electron microscope (SEM).

In a particular embodiment of the present invention, the noble metal content of the catalyst layer is 0.1 to 10.0 mg/cm$^2$, preferably 0.2 to 6.0 mg/cm$^2$ and more preferably 0.2 to 3.0 mg/cm$^2$. These values can be determined by elemental analysis of a flat sample.

The catalyst layer is generally not self-supporting, but rather is typically applied to the gas diffusion layer and/or the membrane. In this case, some of the catalyst layer can diffuse, for example, into the gas diffusion layer and/or the membrane, as a result of which transition layers form. Another result of this may be that the catalyst layer can be viewed as part of the gas diffusion layer.

According to the invention, the surfaces of the polymer electrolyte membrane are in contact with the electrodes in such a way that the first electrode covers the front side of the polymer electrolyte membrane and the second electrode covers the back side of the polymer electrolyte membrane, each partly or fully, preferably only partly. In this context, the front and back sides of the polymer electrolyte membrane refer, respectively, to the sides of the polymer electrolyte membrane facing toward and away from the observer, observed proceeding from the first electrode (at the front), preferably the cathode, in the direction of the second electrode (at the back), preferably the anode.

For further information about polymer electrolyte membranes and electrodes suitable in accordance with the invention, reference is made to the specialist literature, especially to patent applications WO 01/18894 A2, DE 195 09 748, DE 195 09 749, WO 00/26982, WO 92/15121 and DE 197 57 492. The disclosure in the aforementioned references regarding the structure and the production of membrane electrode assemblies, and the electrodes, gas diffusion layers and catalysts to be selected, is also part of the description.

The production of the inventive membrane electrode assembly is obvious to the person skilled in the art. In general, the different constituents of the membrane electrode assembly are placed one on top of another and bonded to one another by pressure and temperature, with lamination typically at a temperature in the range from 10 to 300° C., especially 20° C. to 200° and with a pressure in the range from 1 to 1000 bar, especially from 3 to 300 bar.

Since the power of a single fuel cell is often too low for many applications, in the context of the present invention, several individual fuel cells are preferably combined via separator plates to give one fuel cell (fuel cell stack). In this case, the separator plates, optionally in interplay with further seal materials, should seal the gas spaces of the cathode and of the anode from the outside and between the gas spaces of the cathode and of the anode. For this purpose, the separator plates are preferably applied with sealing to the membrane electrode assembly. The sealing action can be enhanced further by compressing the composite composed of separator plates and membrane electrode assembly.

Particularly surprisingly, it has been found that the inventive membrane electrode assemblies feature a distinct improvement in mechanical stability and strength and can therefore be used for production of fuel cell stacks with particularly high performance. The performance variations which have been customary to date are no longer observed in the resulting fuel cell stacks, and a hitherto unknown quality, reliability and reproducibility are achieved.

The separator plates preferably each have at least one gas channel for reaction gases, which are favorably arranged on the sides facing the electrodes. The gas channels should enable the distribution of the reactant fluids.

The inventive membrane electrode assemblies, owing to their dimensional stability at varying ambient temperatures and air humidity, can be stored or shipped without any problem. Even after prolonged storage or after shipping to sites with very different climatic conditions, the dimensions of the membrane electrode assemblies are correct for problem-free incorporation into fuel cell stacks. The membrane electrode assembly in that case no longer needs to be conditioned on site for external installation, which simplifies the production of the fuel cell and saves time and costs.

An advantage of preferred membrane electrode assemblies is that they enable the operation of the fuel cell at temperatures above 120° C. This applies to gaseous and liquid fuels, for example hydrogen-comprising gases, which are prepared, for example, in an upstream reforming step from hydrocarbons. The oxidant used may, for example, be oxygen or air.

A further advantage of preferred membrane electrode assemblies is that they have a high tolerance to carbon monoxide in operation above 120° C. even with pure platinum catalysts, i.e. without a further alloy constituent. At temperatures of 160° C. for example, more than 1% CO may be present in the fuel gas without this leading to any noticeable reduction in the performance of the fuel cell.

Preferred membrane electrode assemblies can be operated in fuel cells without any need to moisten the fuel gases and the oxidants in spite of the high operating temperatures possible. The fuel cell nevertheless works stably and the membrane does not lose its conductivity. This simplifies the overall fuel cell system and brings additional cost savings since the control of the water circuit is simplified. This additionally also improves the characteristics at temperatures below 0° C. in the fuel cell system.

Preferred membrane electrode assemblies surprisingly allow the fuel cell, without any problem, to be cooled to room temperature and below and then put back into operation, without losing performance. Conventional phosphoric acid-base fuel cells, in contrast, sometimes have to be kept at a temperature above 40° C. even when the fuel cell system is switched off, in order to avoid irreversible damage.

In addition, the preferred membrane electrode assemblies of the present invention exhibit very high long-term stability. It has been found that an inventive fuel cell can be operated continuously over long periods, for example more than 5000 hours, at temperatures of more than 120° C. with dry reaction gases without any noticeable degradation in performance being detectable. The power densities achievable are still very high even after such a long time.

As a result of the formation of a covalent chemical bond between the fibrous reinforcing elements and the polymer of the polymer electrolyte membrane, a high dimensional stability of the membrane electrode assembly is obtained. Creeping of the polymer electrolyte membrane is prevented or minimized, and so a high zero-load voltage is obtained even after a long period, for example more than 5000 hours. The zero-load voltage reflects the quality of the membrane electrode assembly. The high dimensional stability obtained as a result of the formation of a covalent chemical bond between the fibrous reinforcing elements and the polymer of the polymer electrolyte membrane can be recognized by comparison with unfunctionalized fibrous reinforcements. For this purpose, the zero-load voltage of a membrane electrode assembly comprising a reinforced polymer electrolyte membrane is determined as a function of operating time under oxidizing conditions. A polymer electrolyte membrane with functionalized fibrous reinforcing elements and a covalent chemical bond exhibits a lifetime increased by a factor of 4 under these test conditions, as compared with a polymer electrolyte membrane with unfunctionalized fibrous reinforcing elements without a covalent chemical bond.

The inventive fuel cells exhibit, even after a long period, for example more than 5000 hours, a high zero-load voltage, which is preferably at least 900 mV after this time. To measure the zero-load voltage, a fuel cell is operated at zero current with a hydrogen flow at the anode and an air flow at the cathode. The measurement is effected by switching the fuel cell from a current of 0.2 A/cm$^2$ to the zero-current state and then recording the zero-load voltage in that state for 5 minutes. The value after 5 minutes is the corresponding zero-load potential. The values measured for the zero-load voltage apply to a temperature of 160° C. In addition, the fuel cell after this time preferably exhibits low gas crossover. To measure the crossover, the anode side of the fuel cell is operated with hydrogen (5 l/h), the cathode with nitrogen (5 l/h). The anode serves as the reference and counter-electrode, the cathode as the working electrode. The cathode is set to a potential of 0.5 V and the hydrogen which diffuses through the membrane is oxidized at the cathode with mass transfer limitation. The resulting current is a measure of the hydrogen permeation rate. The current is <3 mA/cm$^2$, preferably <2 mA/cm$^2$, more preferably <1 mA/cm$^2$, in a 50 cm$^2$ cell. The values measured for the H$_2$ crossover relate to a temperature of 160° C.

In addition, the inventive membrane electrode assemblies are notable for an improved thermal and corrosion stability and a comparatively low gas permeability, especially at high temperatures. A decrease in the mechanical stability and in the structural integrity, especially at high temperatures, is avoided in the best possible manner in accordance with the invention.

Furthermore, the inventive membrane electrode assemblies can be produced in an inexpensive and simple manner.

For further information about membrane electrode assemblies, reference is made to the technical literature, especially to the U.S. Pat. No. 4,191,618, U.S. Pat. No. 4,212,714 and U.S. Pat. No. 4,333,805. The disclosure present in the aforementioned literature references [U.S. Pat. No. 4,191,618, U.S. Pat. No. 4,212,714 and U.S. Pat. No. 4,333,805] regarding the structure and the production of membrane electrode assemblies, and the electrodes, gas diffusion layers and catalysts to be selected, is also part of the description.

WORKING EXAMPLES

Example 1

Functionalization of a PEEK Sheet to Give a PEEK-OH Sheet

Under air with exclusion of moisture, sodium borohydride (2.5 g) in dimethyl sulfoxide (1000 ml) is heated to 120° C. while stirring and dissolved. Subsequently, the technical PEEK sieve sheet (2×SEFAR PEEKTEX 17-145×115/58, 28 cm×35 cm) is suspended in the reactive solution at 120° C. for 3 h, removed from the solution and washed with methanol (15 min), water (10 min), 0.1 N hydrochloric acid (10 min), and finally with ethanol (5 min). Finally, the PEEK-OH sheet is dried at 60° C. under reduced pressure for 3 h. The MIR analysis demonstrates the reduction in the C=O band at 1650 cm$^{-1}$ by a factor of 2, as compared with the PEEK starting material.

Example 2

Functionalization of the PEEK-OH Sheet to Give a PEEK-Ph-CO$_2$H Sheet

A solution of 4-aminobenzoic acid (3.9 g) in 150 ml of acetic acid is initially charged and the PEEK-OH sheet (example 1) is suspended in this reactive solution for 3 days. The sheet is subsequently rinsed with acetic acid (2×10 min), water (3×10 min) and acetone (2×10 min), and finally dried at 60° C. under reduced pressure for 3 h.

Example 3

Production of a Membrane Reinforced with PEEK-Ph-CO$_2$H Sheet

The PEEK-Ph-CO$_2$H sheet (example 2) is fixed on a glass plate, and a manual coating bar is used to apply a 450 µm-thick sheet consisting of polybenzimidazole in polyphosphoric acid (solids content 5% by weight) (28×28 cm). The polybenzimidazole solution is subsequently heat treated in an oven at 200° C. for one hour, cooled and then hydrolyzed in 50% by weight phosphoric acid overnight to obtain a PEEK sheet-reinforced polybenzimidazole-phosphoric acid membrane with a covalent PEEK-Ph-PBI bond (thickness 350 μm, proton conductivity at 160° C.: 110 S/cm).

The production of the functionalized PEEK sheet and of the inventive reinforced membrane is illustrated by FIG. 1.

Example 4

The inventive PEEK-Ph-PBI-reinforced membranes exhibit, in the membrane electrode assembly (MEA), an improved stability under rapid aging conditions. The membrane electrode assembly based on the membrane and two electrodes is subjected to oxidizing conditions in a single-cell test. The membrane stability is assessed by the repeated measurement of the zero-load voltage in the zero-current state. The process for producing the membrane electrode assembly (MEA) from the membrane and two gas diffusion electrodes by means of a hot pressing operation is known to those skilled in the art. As a startup procedure, the single cells are heated to 160° C. and supplied with 3-5 l/h of hydrogen at the cathode and 5 l/h of air at the cathode. The zero-load voltage and the cell resistance are measured by means of impedance spectroscopy and the test methods are known to those skilled in the art. After the startup procedure, the single cell is stored at 160° C. without supply of media or ingress of air. The zero-load voltage is measured two to three times per week, the decrease in the zero-load voltage and the increase in the cell resistance being assumed to be an indicator of the degradation of the membrane. The test run is ended as soon as the zero-load voltage falls below 800 mV. At the start of the rapid aging test, the value of the zero-load voltage is typically in the region of 1000 mV. The sheet-reinforced membrane with the covalent attachment of the PEEK sheet to the polybenzimidazole matrix (example 4) has a considerably improved lifetime under the test conditions described. While a membrane reinforced with unmodified PEEK sheet (comparative example) exhibits a decrease to 800 mV within a period of 300 h (+/−50 h), the inventive membrane at 1300 h (+/−50 h) has a degradation delayed by a factor of 4.

TABLE 1

| t [h] | Example 4 [V] | Comparative example [V] |
|---|---|---|
| 0 | 1.001 | 0.949 |
| 96 | 1.002 | 0.842 |
| 144 | 1.001 | 0.826 |
| 264 | 0.995 | 0.780 |
| 288 | 0.988 | |
| 432 | 0.971 | |
| 504 | 0.946 | |
| 672 | 0.910 | |
| 936 | 0.891 | |
| 1152 | 0.842 | |
| 1368 | 0.813 | |

Comparative Example

A solution of 2% by weight containing equimolar amounts of 3,3',4,4'-tetraaminobiphenyl and terephthalic acid in polyphosphoric acid (112%) is heated to 280° C. within 100 h. The resulting polybenzimidazole-polyphosphoric acid solution is cooled to a temperature of 100° C. and applied by means of a manual coating bar in a 450 μm-thick layer to a technical sieve sheet, fixed to a glass plate, of polyether ether ketone (SEFAR PEEKTEX 17-145×115/58, 28 cm×28 cm), cooled and then hydrolyzed in 50% by weight phosphoric acid overnight to obtain a PEEK sheet-reinforced polybenzimidazole-phosphoric acid membrane (thickness 340 μm, proton conductivity at 160° C.: 107 S/cm).

The invention claimed is:

1. A membrane electrode assembly comprising at least two electrochemically active electrodes separated by at least one polymer electrolyte membrane, the aforementioned polymer electrolyte membrane having fibrous reinforcing elements which at least partly penetrate the polymer electrolyte membrane, wherein at least some of the fibrous reinforcing elements have functional groups which have a covalent chemical bond between the fibers and the polymer of the polymer electrolyte membrane.

2. The membrane electrode assembly according to claim 1, wherein the polymer electrolyte membrane is fiber-reinforced.

3. The membrane electrode assembly according to claim 2, wherein the reinforcing elements comprise monofilaments, multifilaments, short and/or long fibers, nonwovens, wovens, loop-drawn knits and/or loop-formed knits.

4. The membrane electrode assembly according to claim 2, wherein the reinforcing elements comprise functionalized polyether ketones (PEKs), polyether ether ketones (PEEKs), polysulfones, polyether sulfones, polyazoles, polyacrylonitriles (PANs), polyphosphazenes, polyphenylene oxides, polyether imides, or polyaramids.

5. The membrane electrode assembly according to claim 1, wherein that the reinforcing elements have a diameter in the range from 10 μm to 1000 μm.

6. The membrane electrode assembly according to claim 1, wherein the reinforcing elements have a Young's modulus of at least 5 GPa.

7. The membrane electrode assembly according to claim 1, wherein the reinforcing elements have an elongation at break of 0.5 to 100%.

8. The membrane electrode assembly according to claim 1, wherein the proportion by volume of the reinforcing elements, based on the total volume of the polymer electrolyte membrane, is in the range from 5% by volume to 95% by volume.

9. The membrane electrode assembly according to claim 1, wherein the polymer electrolyte membrane comprises a polyazole.

10. The membrane electrode assembly according to claim 1, wherein the polymer electrolyte membrane comprises a polybenzimidazole.

11. The membrane electrode assembly according to claim 10, wherein the polymer electrolyte membrane has derivatives derived with phosphoric acid or from phosphoric acid.

12. The membrane electrode assembly according to claim 11, wherein the acid content is between 3 and 50 mol per repeat unit of the polymer.

13. A process for producing the membrane electrode assembly according to claim 9, comprising the steps of
A) mixing (i) aromatic tetraamino compounds with aromatic carboxylic acids in polyphosphoric acid, or (ii) mixing polyazole prepolymers in polyphosphoric acid, or (iii) mixing polyazole polymers in polyphosphoric acid to form a solution and/or dispersion,
B) arranging fibrous reinforcing elements on a carrier, said fibrous reinforcing elements having at least one functional group selected from amines, carboxylic acids, carboxylic esters, carboxylic anhydrides, carbonyl halides, carboxamides, acetals, alcohols, ethers, sulfonyl halides and halides, or mixtures thereof, C) applying a layer using the mixture according to step A) to the carrier from step B) in such a way that the reinforcing elements at least partly penetrate the mixture, D) heating the flat structure/layer obtainable according to step C) under inert gas to temperatures of up to 350° C. to form covalent chemical bonds from the polyazole polymer to the functional group of the fibrous reinforcing elements, E) treating the membrane formed in step D) (until it is self-supporting).

14. A process for producing the membrane electrode assembly according to claim 10, comprising the steps of
   A) mixing (i) aromatic tetraamino compounds with aromatic carboxylic acids in polyphosphoric acid, or (ii) mixing polyazole prepolymers in polyphosphoric acid, or (iii) mixing polyazole polymers in polyphosphoric acid to form a solution and/or dispersion,
   B) arranging fibrous reinforcing elements on a carrier, said fibrous reinforcing elements having at least one functional group selected from amines, carboxylic acids, carboxylic esters, carboxylic anhydrides, carbonyl halides, carboxamides, acetals, alcohols, ethers, sulfonyl halides and halides, or mixtures thereof,
   C) applying a layer using the mixture according to step A) to the carrier from step B) in such a way that the reinforcing elements at least partly penetrate the mixture,
   D) heating the flat structure/layer obtainable according to step C) under inert gas to temperatures of up to 280° C., to form covalent chemical bonds from the polyazole polymer to the functional group of the fibrous reinforcing elements,
   E) treating the membrane formed in step D) (until it is self-supporting).

15. A process for producing the membrane electrode assembly according to claim 9, comprising the steps of
   A) mixing (i) one or more aromatic tetraamino compounds with (ii) one or more aromatic carboxylic acids or esters thereof which comprise at least two acid groups per carboxylic acid monomer, or (iii) mixing one or more aromatic and/or (iv) heteroaromatic diaminocarboxylic acids, in polyphosphoric acid to form a solution and/or dispersion,
   B) arranging fibrous reinforcing elements on a carrier, said fibrous reinforcing elements having at least one functional group selected from amino, carboxylic acid, carboxylic ester or mixtures thereof,
   C) applying a layer using the mixture according to step A) to the carrier from step B) in such a way that the reinforcing elements at least partly penetrate the mixture,
   D) heating the flat structure/layer obtainable according to step C) under inert gas to temperatures of up to 350° C. to form the polyazole polymer, the latter forming covalent chemical bonds to the functional group of the fibrous reinforcing elements,
   E) treating the membrane formed in step D) (until it is self-supporting).

16. A process for producing the membrane electrode assembly according to claim 10, comprising the steps of
   A) mixing (i) one or more aromatic tetraamino compounds with (ii) one or more aromatic carboxylic acids or esters thereof which comprise at least two acid groups per carboxylic acid monomer, or (iii) mixing one or more aromatic and/or (iv) heteroaromatic diaminocarboxylic acids, in polyphosphoric acid to form a solution and/or dispersion,
   B) arranging fibrous reinforcing elements on a carrier, said fibrous reinforcing elements having at least one functional group selected from amino, carboxylic acid, carboxylic ester or mixtures thereof,
   C) applying a layer using the mixture according to step A) to the carrier from step B) in such a way that the reinforcing elements at least partly penetrate the mixture,
   D) heating the flat structure/layer obtainable according to step C) under inert gas to temperatures of up to 280° C., to form the polyazole polymer, the latter forming covalent chemical bonds to the functional group of the fibrous reinforcing elements,
   E) treating the membrane formed in step D) (until it is self-supporting).

17. The process according to claim 13, wherein the mixture from step A) is heated to a temperature of up to 350° C. to form low molecular weight polyazole polymers or oligomers, and the heating in step D) is entirely or partly omitted.

18. The process according to claim 14, wherein the mixture from step A) is heated to a temperature of up to 280° C. to form low molecular weight polyazole polymers or oligomers, and the heating in step D) is entirely or partly omitted.

19. A process for producing the membrane electrode assembly according to claim 9, comprising the steps of
   1) reacting one or more aromatic tetraamino compounds with one or more aromatic carboxylic acids or esters thereof which comprise at least two acid groups per carboxylic acid monomer, or one or more aromatic and/or heteroaromatic diaminocarboxylic acids in the melt at temperatures of up to 350° C.,
   2) dissolving the solid prepolymer obtained according to step 1) in polyphosphoric acid,
   3) arranging fibrous reinforcing elements on a carrier, said fibrous reinforcing elements having at least one functional group selected from amino, carboxylic acid, carboxylic ester or mixtures thereof,
   4) impregnating the fibrous reinforcing elements with a solution according to step 2) and heating under inert gas to temperatures of up to 300° C. to form the dissolved polyazole polymer, the latter forming covalent chemical bonds to the functional group of the fibrous reinforcing elements,
   5) treating the membrane formed in step 4) until it is self-supporting.

20. A process for producing the membrane electrode assembly according to claim 10, comprising the steps of
   1) reacting one or more aromatic tetraamino compounds with one or more aromatic carboxylic acids or esters thereof which comprise at least two acid groups per carboxylic acid monomer, or one or more aromatic and/or heteroaromatic diaminocarboxylic acids in the melt at temperatures of up to 300° C.,
   2) dissolving the solid prepolymer obtained according to step 1) in polyphosphoric acid,
   3) arranging fibrous reinforcing elements on a carrier, said fibrous reinforcing elements having at least one functional group selected from amino, carboxylic acid, carboxylic ester or mixtures thereof,
   4) impregnating the fibrous reinforcing elements with a solution according to step 2) and heating under inert gas to temperatures of up to 280° C., to form the dissolved polyazole polymer, the latter forming covalent chemical bonds to the functional group of the fibrous reinforcing elements,
   5) treating the membrane formed in step 4) until it is self-supporting.

21. A fuel cell comprising at least one membrane electrode assembly according to claim 1.

* * * * *